(12) United States Patent
Palau et al.

(10) Patent No.: US 8,381,609 B2
(45) Date of Patent: Feb. 26, 2013

(54) ARTICULATED STRUCTURE FOR A MULTI-AXIS ROBOT, AND A ROBOT INCLUDING SUCH A STRUCTURE

(75) Inventors: Joseph Palau, Sevrier (FR); Vincent Gerat, Saint Jorioz (FR); Eric Sallet, Frontenex (FR)

(73) Assignee: Staubli Faverges, Faverges (FR)

( * ) Notice: Subject to any disclaimer, the term of this patent is extended or adjusted under 35 U.S.C. 154(b) by 635 days.

(21) Appl. No.: 12/588,480

(22) Filed: Oct. 16, 2009

(65) Prior Publication Data
US 2010/0095800 A1 Apr. 22, 2010

(30) Foreign Application Priority Data

Oct. 17, 2008 (FR) ...................................... 08 57097

(51) Int. Cl.
*B25J 17/00* (2006.01)
*B25J 17/02* (2006.01)
*B25J 18/00* (2006.01)
(52) U.S. Cl. ...................... 74/490.05; 74/490.01; 901/23
(58) Field of Classification Search .............. 74/490.01, 74/490.03, 490.05; 901/19, 23
See application file for complete search history.

(56) References Cited

U.S. PATENT DOCUMENTS

| | | | | |
|---|---|---|---|---|
| 4,754,663 A | * | 7/1988 | Yasukawa | 74/665 L |
| 5,634,377 A | * | 6/1997 | Kimura et al. | 74/490.04 |
| 6,439,076 B1 | | 8/2002 | Flemmer | |
| 7,752,939 B2 | * | 7/2010 | Ono | 74/490.03 |
| 8,201,472 B2 | * | 6/2012 | Feng | 74/490.01 |

FOREIGN PATENT DOCUMENTS

| | | |
|---|---|---|
| EP | 0658405 | 6/1995 |
| EP | 0667214 | 8/1995 |
| JP | 59146774 | 8/1984 |

* cited by examiner

*Primary Examiner* — Justin Krause
(74) *Attorney, Agent, or Firm* — Dowell & Dowell, PC (57) ABSTRACT

An articulated structure for a multi-axis robot includes a base having an arm hinged to the base about a first axis and a forearm hinged to the arm about a second axis parallel to the first axis, and wherein the forearm forms a deformable parallelogram structure which includes two connecting rods that are hinged to two plates about respective axes that are perpendicular to the first and second axes. The structure also includes a first electric actuator controlling pivoting of the arm about the first axis, a second electric actuator controlling pivoting of the forearm about the second axis, and a third electric actuator mounted directly on one of the base and the arm for controlling pivoting of one of the connecting rods relative to the plates about the axes that are perpendicular to the first and second axes.

12 Claims, 7 Drawing Sheets

ARTICULATED STRUCTURE FOR A MULTI-AXIS ROBOT, AND A ROBOT INCLUDING SUCH A STRUCTURE

BACKGROUND OF THE INVENTION

1. Field of the Invention

The present invention relates to an articulated structure for a multi-axis robot having at least three degrees of freedom, and also to a multi-axis robot including such a structure.

2. Description of the Related Art

In the field of multi-axis robots, it is sometimes necessary to manipulate parts quickly along paths that are close to a plane. This applies for example when taking a part that is moving on a conveyor belt and placing it on a plane conditioning member. SCARA type robots are adapted to working in a horizontal plane. It is sometimes appropriate for these robots to be capable also of performing movements in a vertical plane. In such robots, vertical movement is generally provided by a ball-screw system located close to the tool, i.e. at the end of the articulated structure commonly referred to as the robot arm. This gives rise to a large amount of inertia for this articulated structure, thereby limiting the speed at which the tool can be moved. Furthermore, the size of the ball-screw system can be an impediment under certain conditions of use.

JP-A-59-146774 discloses an articulated structure in which the forearm comprises two plates having two connecting rods hinged between them to form a parallelogram structure, thus enabling the tool to be moved vertically by means of an actuator mounted on the forearm. That motor increases the inertia of the forearm, thereby limiting the speeds with which the tool can be moved.

SUMMARY OF THE INVENTION

The invention seeks more particularly to remedy those drawbacks by proposing a novel articulated structure for a multi-axis robot that has three degrees of freedom and that presents inertia that is small enough to be compatible with high-speed movements.

To this end, the invention relates to an articulated structure for a multi-axis robot having at least three degrees of freedom, the structure comprising:
 a stationary base;
 an arm hinged to the base about a first axis;
 a forearm hinged to the arm about a second axis parallel to the first axis, the forearm forming a deformable parallelogram structure and comprising a first connecting rod and a second connecting rod that are hinged to two plates about respective axes that are perpendicular to the first and second axes;
 a first electric actuator controlling pivoting of the arm about the first axis;
 a second electric actuator controlling pivoting of the forearm about the second axis; and
 a third electric actuator controlling pivoting of the first connecting rod relative to the plates about some of the axes that are perpendicular to the first and second axes.

This structure is characterized in that the third actuator is mounted on the base or on the arm.

By means of the invention, the inertia of the forearm is significantly decreased compared with prior art devices, insofar as the forearm does not need to move the third actuator when it performs pivoting motion about the second axis. This enables high speeds of movement to be achieved for the end of the articulated structure that carries the tool.

According to aspects of the invention that are advantageous but not essential, such a structure may incorporate one or more of the following characteristics, taken in any technically feasible combination:

The third actuator is a rotary actuator and its outlet shaft is centered on an axis parallel to the first axis.
 Means for transmitting motion between the third actuator and the connecting rods comprise at least one belt and a 90° angle transmission. The angle transmission may comprise a pair of gears of the bevel, spiral-bevel, hypoid, or CYLKRO® facing gears, or a system comprising a wheel and a wormscrew.
 In certain embodiments, the third actuator is mounted on the arm.
 In other embodiments, at least the first and third actuators are mounted on the base. Under such circumstances, the third actuator is advantageously of the rotary type, and the axis of rotation of its outlet shaft is in alignment with the first axis. Furthermore, the first and third actuators might be of the rotary type and the axes of rotation of their respective outlet shafts might be in alignment.
 One of the two connecting rods of the forearm forms a box that surrounds the other connecting rod.
 The structure includes a fourth actuator controlling the pivoting of a tool-carrier clamp about an axis parallel to the first and second axes. Under such circumstances, provision can be made for the first connecting rod to be fast in rotation, about one of the axes perpendicular to the first and second axes, with means for transmitting motion generated by the third actuator, for the second connecting rod to follow the first connecting rod in the pivoting motion of the connecting rods relative to the plates, for the fourth actuator to be mounted on a plate of the forearm that is hinged to the arm, for the tool-carrier clamp to be supported by the other plate, and for the second connecting rod to transmit to the tool-carrier clamp the motion generated by the fourth actuator.

The invention also provides a multi-axis robot fitted with an articulated structure as mentioned above. Such a robot can operate at higher speeds than those in the state of the art. In addition, given its lower masses in movement, its lifetime is increased.

BRIEF DESCRIPTION OF THE DRAWINGS

The invention can be better understood and other advantages thereof appear more clearly in the light of the following description of four embodiments of an articulated structure and a multi-axis robot making use thereof, given purely by way of example and made with reference to the accompanying drawings, in which.

DESCRIPTION OF THE PREFERRED EMBODIMENTS

Figure 1:
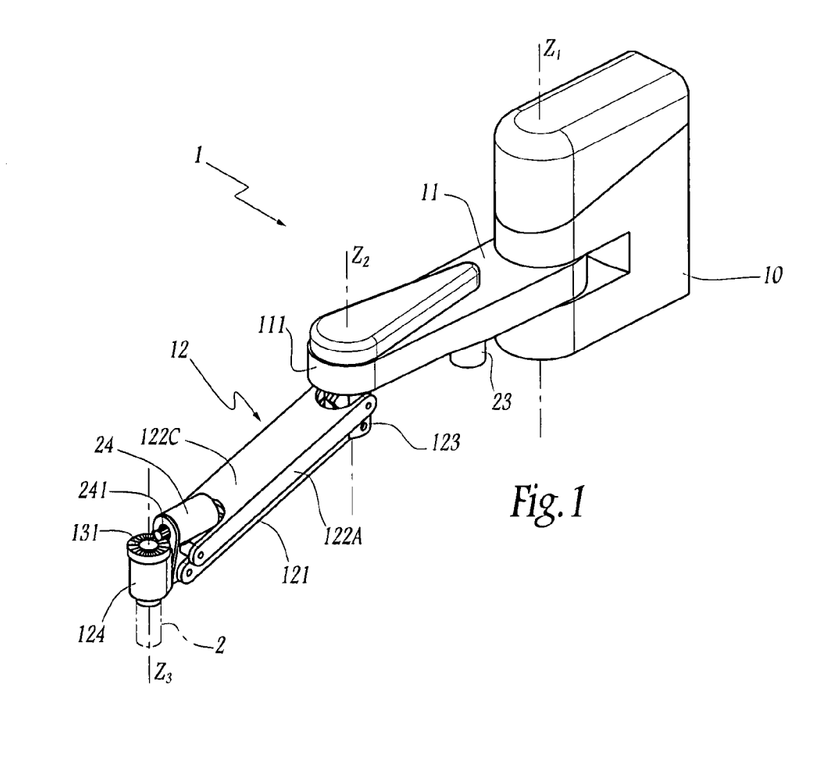
FIG. 1 is a perspective view of an articulated structure of a multi-axis robot in accordance with a first embodiment of the invention.
Figure 2:
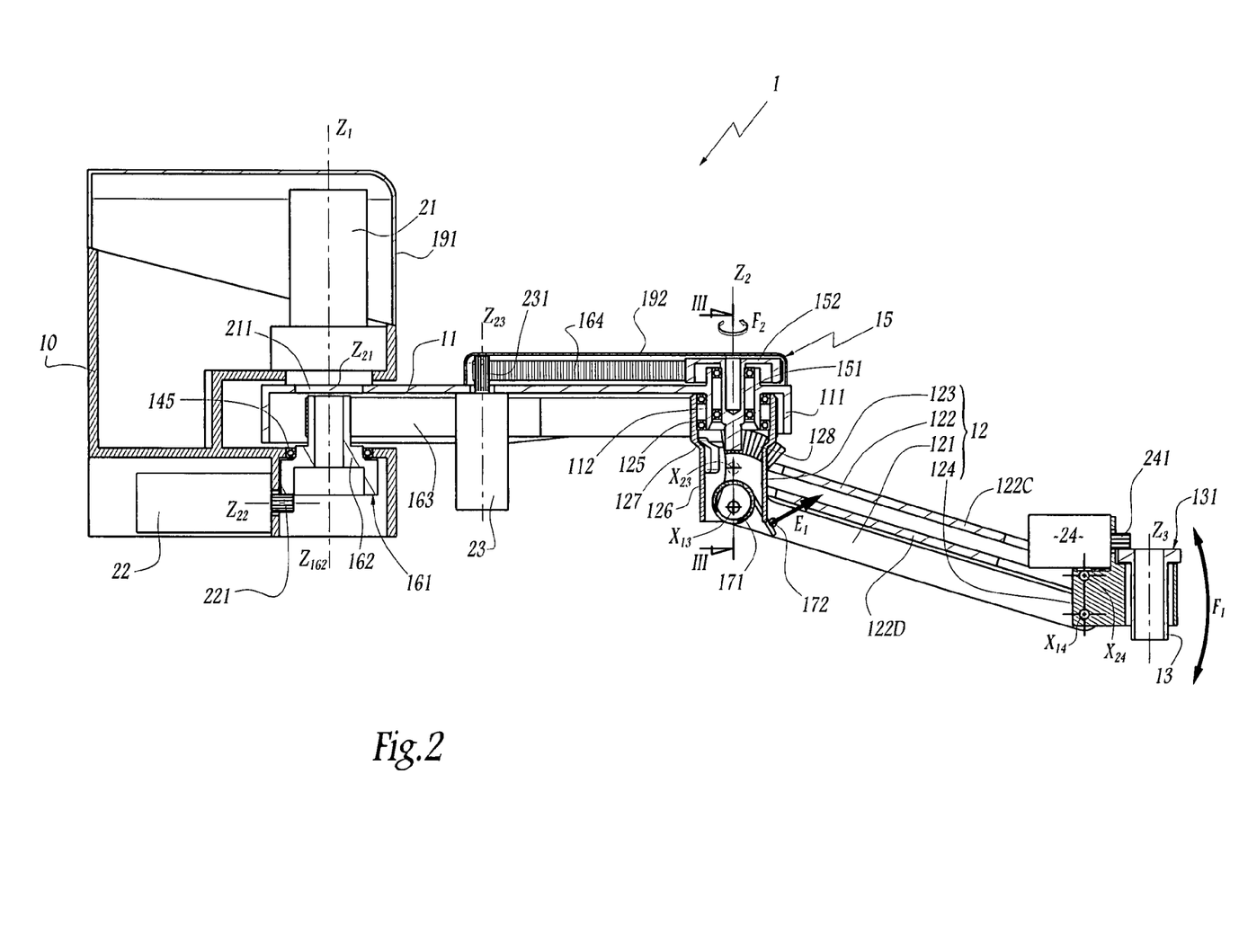
FIG. 2 is a longitudinal section of the FIG. 1 structure in its rectilinear configuration.
Figure 3:
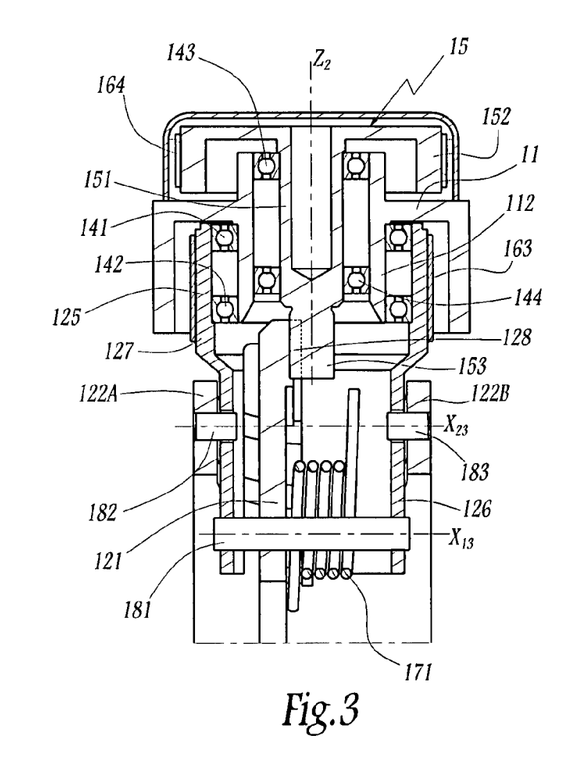
FIG. 3 is a section on a larger scale on line of FIG. 2.

The structure 1 visible in FIGS. 1 to 3 form part of a multi-axis robot that also includes an electronic control unit, cable bundles, and/or bundles of ducts for feeding gas under pressure, and other accessories that are not shown in order to clarify the drawings. Similarly, these elements are not shown for the robots of the other embodiments.

The structure 1 is for moving a tool 2 to various positions, which tool is represented diagrammatically by chain-dotted lines in FIG. 1 only, the tool being moved along paths that extend not only in a horizontal plane, but also perpendicularly relative to that plane. By way of example, the tool 2 may be a gripper tool.

The structure 1 comprises a base 10 that is stationary relative to the premises in which the structure 1 is installed. This base forms a clevis for hinging an arm 11 about a vertical axis $Z_1$.

On the base 10, there is mounted a first actuator 21 that is constituted by a rotary electric gear motor with its outlet shaft 211 in alignment on the axis $Z_1$ and secured to rotate with the arm 11. The actuator 21 drives the arm 11 in rotation about the axis $Z_1$.

The arm 11 supports a forearm 12 that is articulated relative to the arm 11 about an axis $Z_2$ parallel to the axis $Z_1$, and thus likewise vertical in the example shown.

The forearm 12 comprises a first connecting rod, referred to as a "main" connecting rod 121, and a second connecting rod, referred to as a "secondary" or "follower" connecting rod 122, the connecting rods extending parallel to each other from a plate 123 forming part of the forearm 12 and mounted at the end 111 of the arm 11 that is furthest from the base 10. The forearm 12 also has a second plate 124 that supports a tool-carrier clamp 13 via which the tool 2 can be installed. The plate 124 forms a receiver cylinder in which the clamp 13 is mounted to pivot about an axis $Z_3$ parallel to the axes $Z_1$ and $Z_2$ and constituting a central axis of the clamp 13.

$X_{13}$ and $X_{23}$ are used respectively to identify the hinge axes of the connecting rods 121 and 122 relative to the plate 123. $X_{14}$ and $X_{24}$ designate respectively the hinge axes of the connecting rods 121 and 122 relative to the plate 124. The axes $X_{13}$, $X_{23}$, $X_{14}$, and $X_{24}$ are perpendicular to the axes $Z_1$ and $Z_2$ and they define a deformable parallelogram, in the plane of FIG. 2. The connecting rods 121 and 122 and the plates 123 and 124 thus form a forearm structure 12 in the form of a hinged or deformable parallelogram, thus enabling the height of the clamp 13 to be varied, as represented by double-headed arrow $F_1$ in FIG. 2, while conserving the orientation of the central axis $Z_3$ of the clamp 13.

The plate 123 is mounted on the end 111 of the arm 11 with freedom to turn about the axis $Z_2$. The plate 123 is of tubular shape centered on the axis $Z_2$ when the structure 1 is in the assembled configuration. The plate 123 has two portions 125 and 126 of different diameters that are interconnected by a frustoconical portion 127.

Towards the end 111, the arm 11 forms a sleeve 112 centered on the axis $Z_2$. The portion 125 of the plate 123 is placed around a portion of the sleeve 112, with two ball-bearings 141 and 142 being interposed between them, thereby enabling the plate 123 to turn about the sleeve 122 and the axis $Z_2$.

Furthermore, a central rod 151 of a pulley 15 is disposed inside the sleeve 112 and is aligned on the axis $Z_2$, with two ball bearings 143 and 144 being interposed between them.

A second actuator 22 is mounted on the plate 10. The outlet shaft 221 of the actuator 22 extends along a horizontal axis $Z_{22}$ and has a gear-shaped end that meshes with a toothed annular portion 161 of a pulley 162 that is mounted to rotate freely on the base 10 with an interposed ball bearing 145. The shaft 221 and the pulley 162 together form a 90° angle transmission. The axis of rotation $2_{162}$ of the pulley 162 coincides with the axis $Z_1$ in the example shown.

The pulley 162 drives a belt 163 in rotation, which belt passes round part of the portion 125 of the plate 123. It is thus possible to turn the plate 123 about the axis $Z_2$ by a drive generated by the actuator 22 and transmitted via the elements 221, 161, 162, and 163. In other words, the actuator 22 controls the pivoting of the forearm 12 about the axis $Z_2$.

A third actuator 23 is mounted on the arm 11 and its outlet shaft 231 drives a belt 164 that passes round the head of the pulley 15. At its end remote from the pulley head 115, the rod 151 carries a gear 153 that meshes with a toothed sector 128 secured to the connecting rod 121. The gear pair constituted by the parts 153 and 128 constitutes a 90° angle transmission enabling the rotary movement of the pulley 15 about the axis $Z_2$ to be transformed into a pivoting movement of the connecting rod 121 about the axis $X_{13}$.

The gear part formed between the parts 153 and 128 may be of the type known under the name CYLKRO® facing gears made up of an ordinary gearwheel having an involute cut and a portion of a wheel with complementary teeth. Such a gear pair presents the advantage of being simple to adjust since the position of the gearwheel 153 along its axis of rotation Z.sub.2 does not need to be set accurately. Other types of 90.degree. gear pairs may be used between the rod 151 and the connecting rod 121.

A spring 171 is mounted in the portion 126 of the plate 123 and bears against a peg 172 secured to the main connecting rod 121, exerting a resilient force $E_1$ thereon, tending to cause the plate 124 to rise. The spring 171 can thus be considered as being means for assisting the movement of the plate 124 in an upward direction in FIG. 2. When the axes $Z_1$ and $Z_2$ are vertical, as shown in the figures, the spring 171 constitutes means for compensating the weight of the tool 2.

As can be seen more clearly in FIG. 3, a shaft 181 that extends along the axis $X_{13}$ constitutes the means hinging the connecting rod 121 to the plate 123. The spring 171 is mounted around the shaft 181. Two pegs 182 and 183 extending along the axis $X_{23}$ form the means for hinging the connecting rod 122 to the plate 123. Shafts of the same type are used for constituting the hinge between the connecting rods 121 and 122 and the plate 124.

The connecting rod 121 comprises an essentially vertical web that is clearly visible in FIG. 2. The connecting rod 122 is in the form of a box beam of rectangular cross-section with two vertical walls 122A and 122B that can be seen in FIGS. 1 and 3 and two walls 122C and 122D of orientation that varies as a function of the pivoting of the connecting rod 122 about the axis $X_{23}$ and visible in FIG. 2.

The actuator 23 is an electric gear motor having its weight supported by the arm 11, such that this weight does not impede the movements of the forearm 12 and of the clamp 13, as represented by double-headed arrows $F_1$ and $F_2$ in FIG. 2, with this being particularly advantageous for achieving high travel speeds for the tool 2.

It should be observed that the axes $Z_{21}$, $Z_{22}$, and $Z_{23}$ of the outlet shaft 211, 221, and 231 of the actuators 21, 22, and 23 are vertical and parallel to the axes $Z_1$ and $Z_2$. The axes $Z_1$ and $Z_{21}$ coincide.

The connection between the actuator 23 and the connecting rod 121, by means of the pulley 162 and the 90° angle transmission, makes it possible to use lightweight materials presenting low inertia for driving the forearm 12 when moving the clamp 13 vertically. The reduction ratio between the outlet shaft 231 and the connecting rod 121 lies in the range 30 to 100.

Similarly, the connection by the pulleys 162 and 15 and the belt 163 enables lightweight materials presenting low inertia to be used for driving the forearm 12 in pivoting about the axis $Z_2$.

A fourth actuator 24 is installed on the plate 124, and its outlet shaft 241 forms a gearwheel that engages a toothed annular surface 131 of the clamp 13, thereby enabling the clamp 13 and the tool 2 that it carries to be driven in rotation about the axis $Z_3$.

Two covers 191 and 192 are mounted, one on the base 10 to protect the actuators 21 and 22, and the other on the arm 11 to protect the belt 164 and the head 152 of the pulley 15.

In the second to fourth embodiments of the invention as shown in FIGS. 4 to 11, elements analogous to those of the first embodiment are given the same references.

Figures 4, 6:
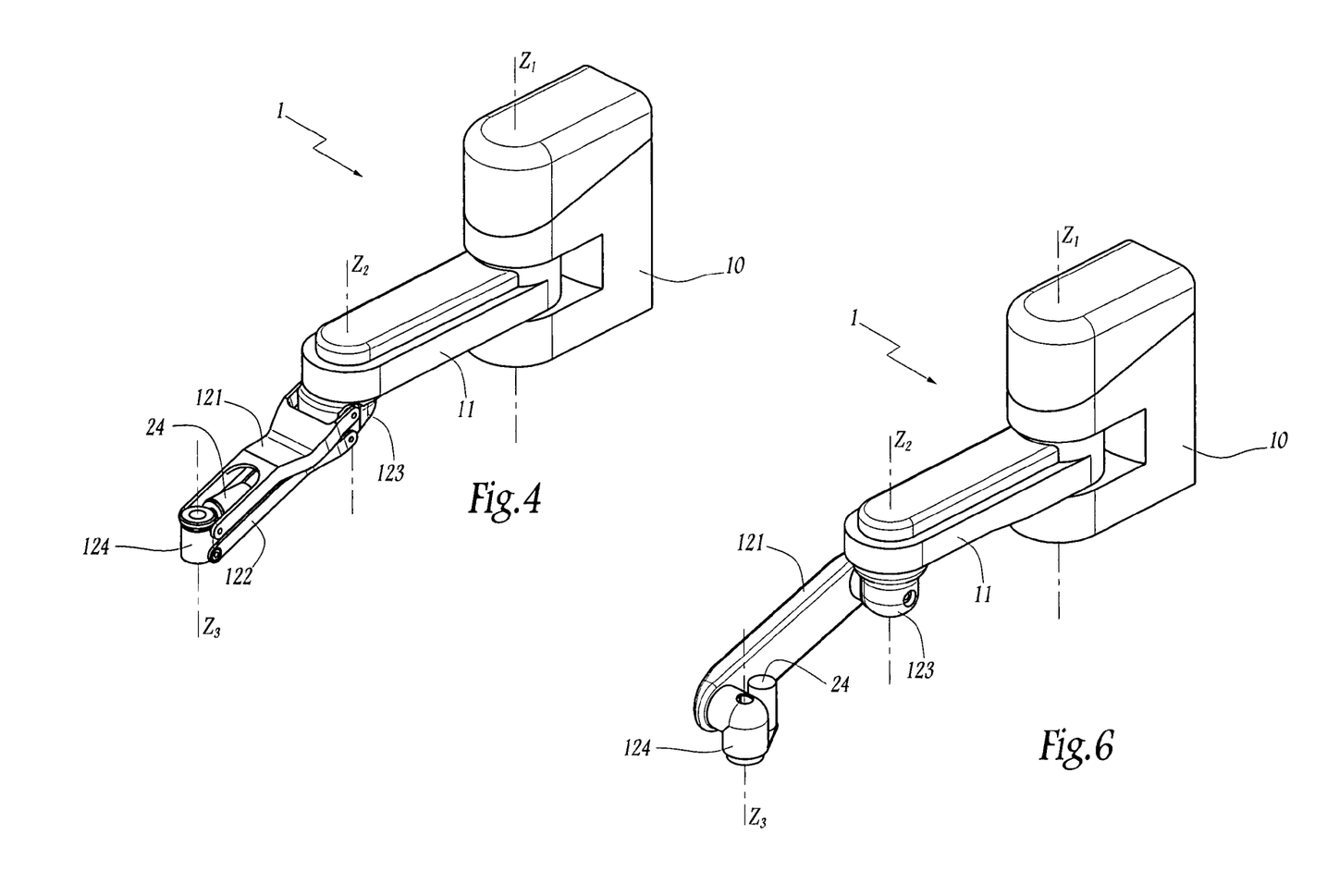
FIG. 4 is a view analogous to FIG. 1 for a structure in accordance with a second embodiment of the invention.
FIG. 6 is a view analogous to FIG. 1 for a structure in accordance with a third embodiment of the invention.
Figure 5:
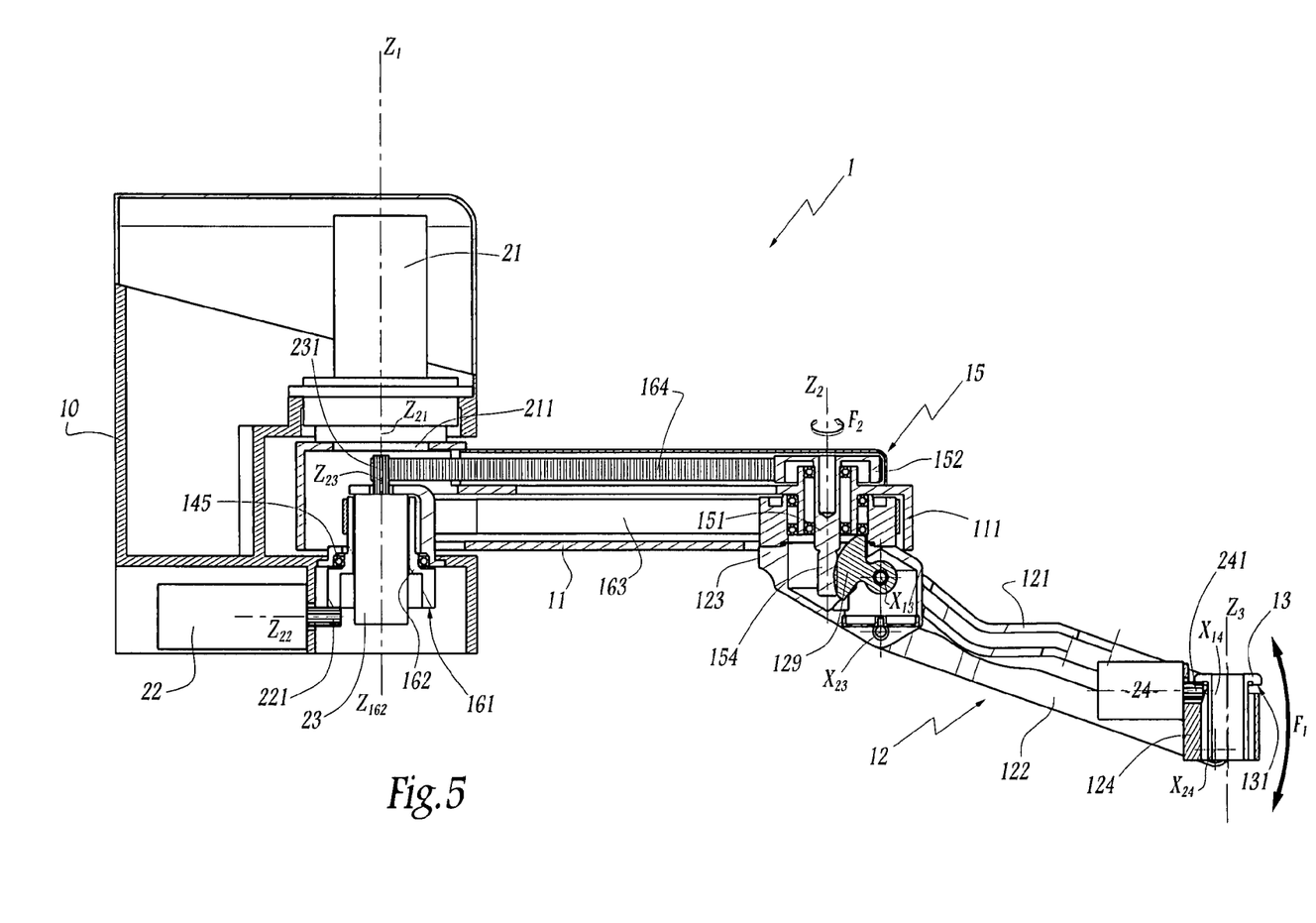
FIG. 5 is a longitudinal section analogous to FIG. 2 but for the structure of FIG. 4.

In the second embodiment, the articulated structure comprises a base 10, an arm 11, and a forearm 12, itself constituted by a "main" first connecting rod 121, a "secondary" second connecting rod 122, and two plates 123 and 124 forming a deformable parallelogram structure. Two actuators 21 and 22 are mounted on the base 10 respectively to cause the arm 11 to pivot about a vertical axis $Z_1$ and to cause the forearm 12 to pivot about a vertical axis $Z_2$ that is parallel to the axis $Z_1$.

For this purpose, the outlet shaft 211 of the actuator 21 engages the arm 11 while the outlet shaft 221 of the actuator 22 is in the form of a gearwheel and meshes with a toothed portion 161 of a pulley 162. The elements 221 and 162 thus form a 90° angle transmission assembly and the pulley 162 is driven to rotate about an axis $Z_{162}$ in alignment with the axis $Z_1$. This pulley itself drives a belt 163 that in turn drives rotation of the plate 123 of the forearm 12, which plate secures the forearm to the end 111 of the arm 11.

A third actuator 23 is mounted on the base 10 and, as in the first embodiment, serves to drive the forearm 12 in its motion for moving the plate 124 vertically, as represented by double-headed arrow $F_1$.

The actuator 23 is installed at the center of the pulley 162, which is supported by the base 10 via a ball bearing 145. The actuator 23 is mounted stationary relative to the base 10, with this being made possible by radial clearance between the actuator and the pulley 162.

The outlet shaft 231 of the actuator 23 engages a belt 164 that surrounds the head 152 of a pulley 15, as in the first embodiment. This pulley head 152 is secured to a rod 151 with an end bearing a wormscrew 154 engaged with a wheel sector 129 secured to the main connecting rod 121.

As before, references $X_{13}$, $X_{14}$, $X_{23}$, and $X_{24}$ designate the hinge axes of the connecting rods 121 and 122 relative to the plates 123 and 124. The axes $X_{13}$, $X_{14}$, $X_{23}$, and $X_{24}$ are perpendicular to the axes $Z_1$ and $Z_2$.

Since the actuator 23 is supported by the base 10, its inertia does not penalize the movements of the assembly constituted by the arms 11 and 12 about the axis $Z_1$.

The central axis $Z_{23}$ of the outlet shaft 231 is in alignment with the central axis $Z_{21}$ of the outlet shaft 211, these axes coinciding with the axis $Z_1$. This configuration makes the structure 1 very compact, while enabling the arm 11 and the forearm 12 to be driven quickly and accurately. In particular, the fact that the axes $Z_{23}$, $2_{162}$, and $Z_1$ coincide ensures that the spacing between the axes $Z_{23}$, $Z_{162}$, and $Z_2$ remains constant, thereby ensuring constant tension in the belts 163 and 164.

As in the first embodiment, the plate 124 carries a fourth actuator 24. Its outlet shaft 241 forms a gearwheel that meshes with an annular set of teeth 131 on the clamp 13 in order to drive rotation of the clamp about an axis $Z_3$ parallel to the axes $Z_1$ and $Z_2$.

For the third embodiment as shown in FIGS. 6 to 9, the description relates only to its differences relative to the second embodiment. The forearm 12 is constituted by a "main" first connecting rod 121 in the form of a housing containing a "secondary" second connecting rod 122. The connecting rod 121 is hinged via a ball bearing 146 about a sleeve 221 forming part of a plate 123. This connecting rod 121 is secured to a shaft 222 from which there extends a toothed sector 128 of the same type as in the first embodiment and meshing with a gearwheel 153, likewise of the same type as in the first embodiment, thereby enabling the connecting rod 121 to be driven to turn about an axis $X_{13}$ perpendicular to the vertical hinge axis $Z_2$ of the forearm 12 relative to the arm 11.

Figure 8:
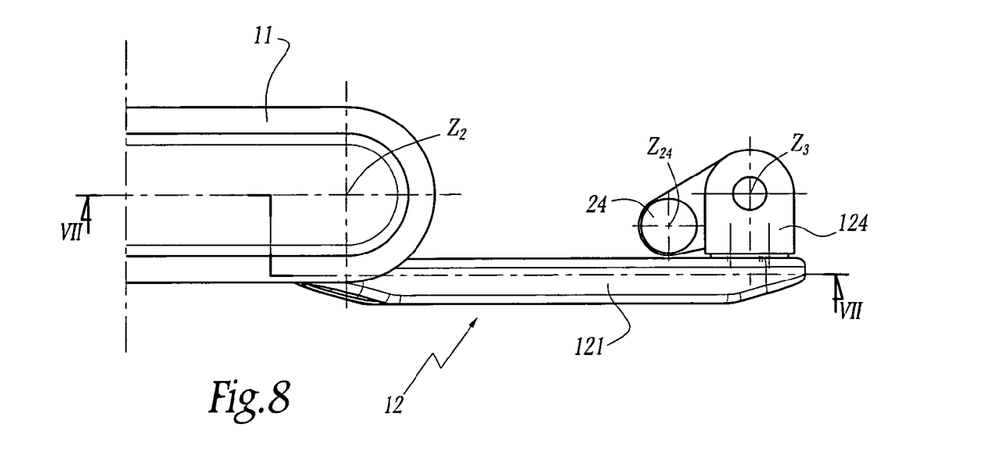
FIG. 8 is a plan view of a portion of the upper arm and the forearm of the structure of FIGS. 6 and 7; VII-VII specifies the section plane of FIG. 7.
Figure 9:
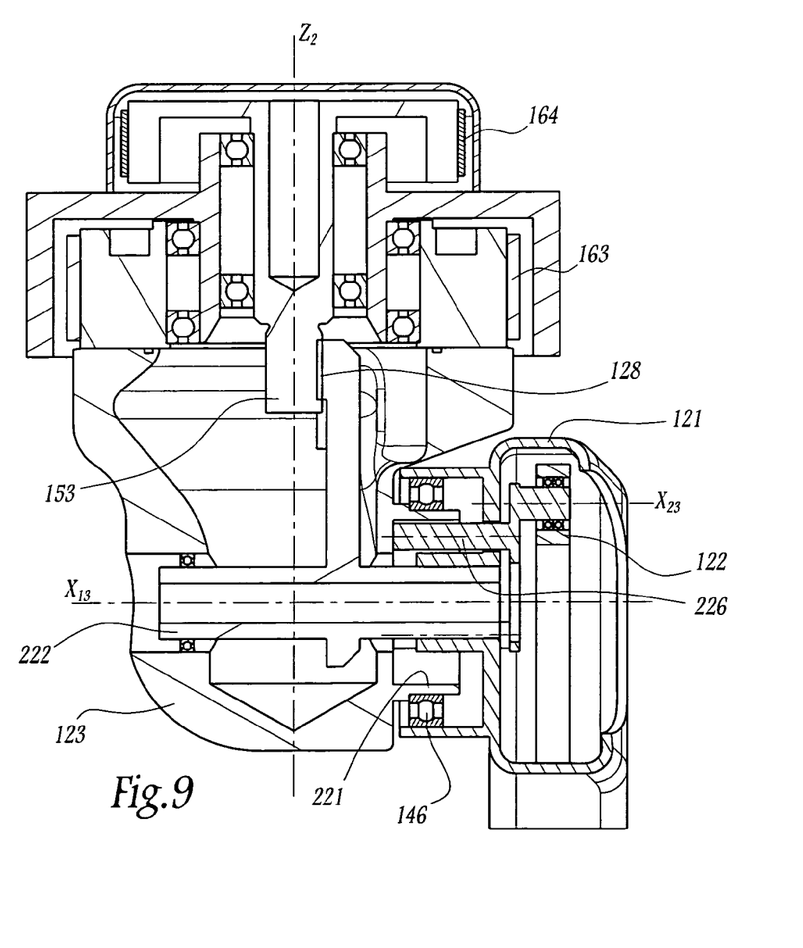
FIG. 9 is a section on a larger scale on line IX-IX of FIG. 7.

Two auxiliary plates 223 and 224 are secured respectively to the plates 123 and 124 via pegs 226 that pass through slots 225 formed in the main connecting rod 121. The auxiliary plates 223 and 224 support the hinges of the secondary connecting rod 122 about axes $X_{23}$ and $X_{24}$. Thus, the axes $X_{13}$ and $X_{23}$ remain stationary relative to each other, in the frame of reference of the plate 123, as do the axes $X_{14}$ and $X_{24}$ in the frame of reference of the plate 124.

Figure 7:
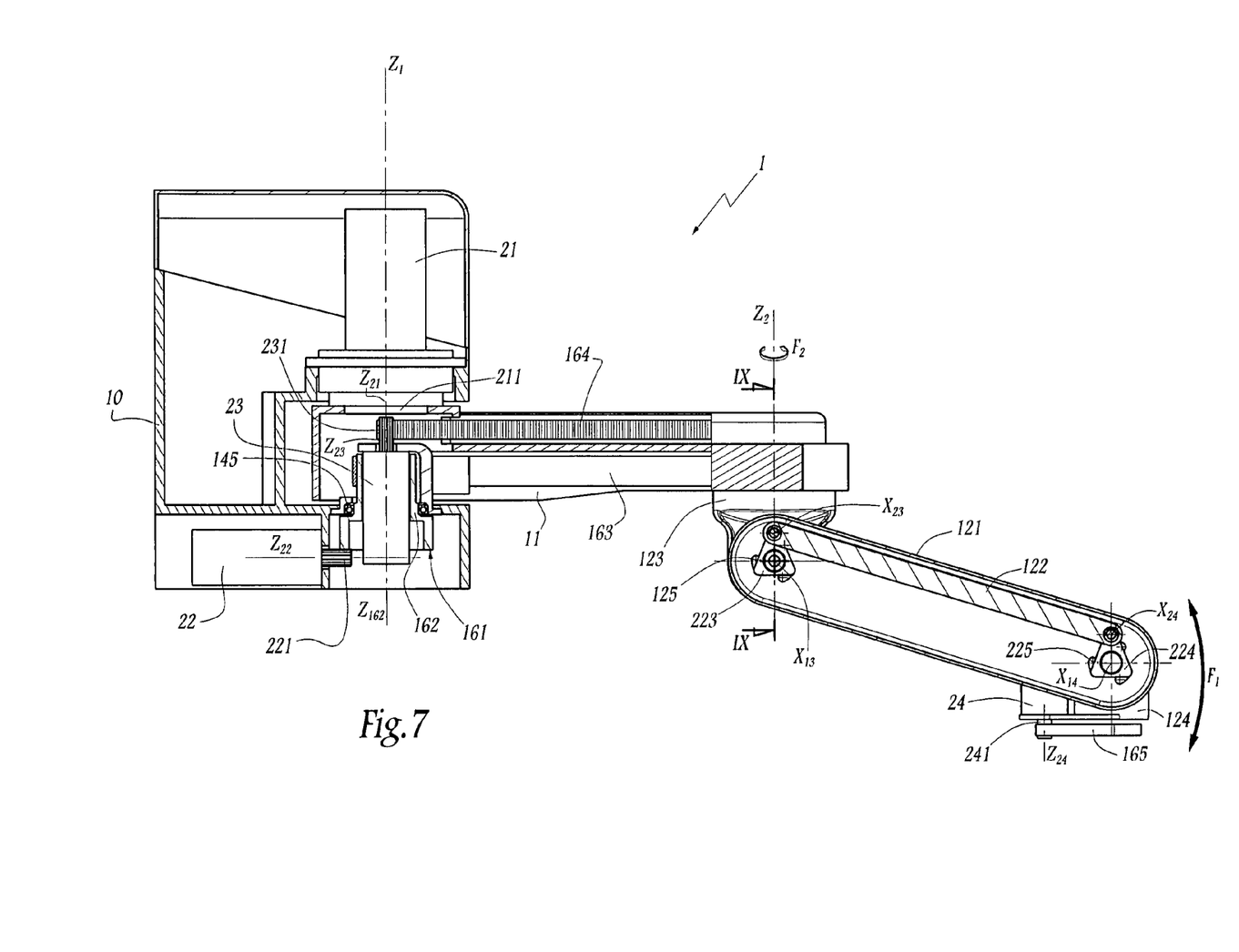
FIG. 7 is a longitudinal section analogous to FIG. 2 but for the structure of FIG. 6.

The fact of the connecting rod 121 surrounding the connecting rod 122 presents a clear advantage in terms of safety, without penalizing the overall size of the forearm 12.

A fourth actuator 24 is supported by the plate 124 with the axis of rotation $Z_{24}$ of its outlet shaft 241 being parallel to the hinge axis $Z_2$ between the forearm 12 and the arm 11, and to the axis of rotation $Z_3$ of the tool-carrier clamp. The shaft 241 is connected to the tool-carrier clamp 13 by a belt 165.

Figures 10, 11:
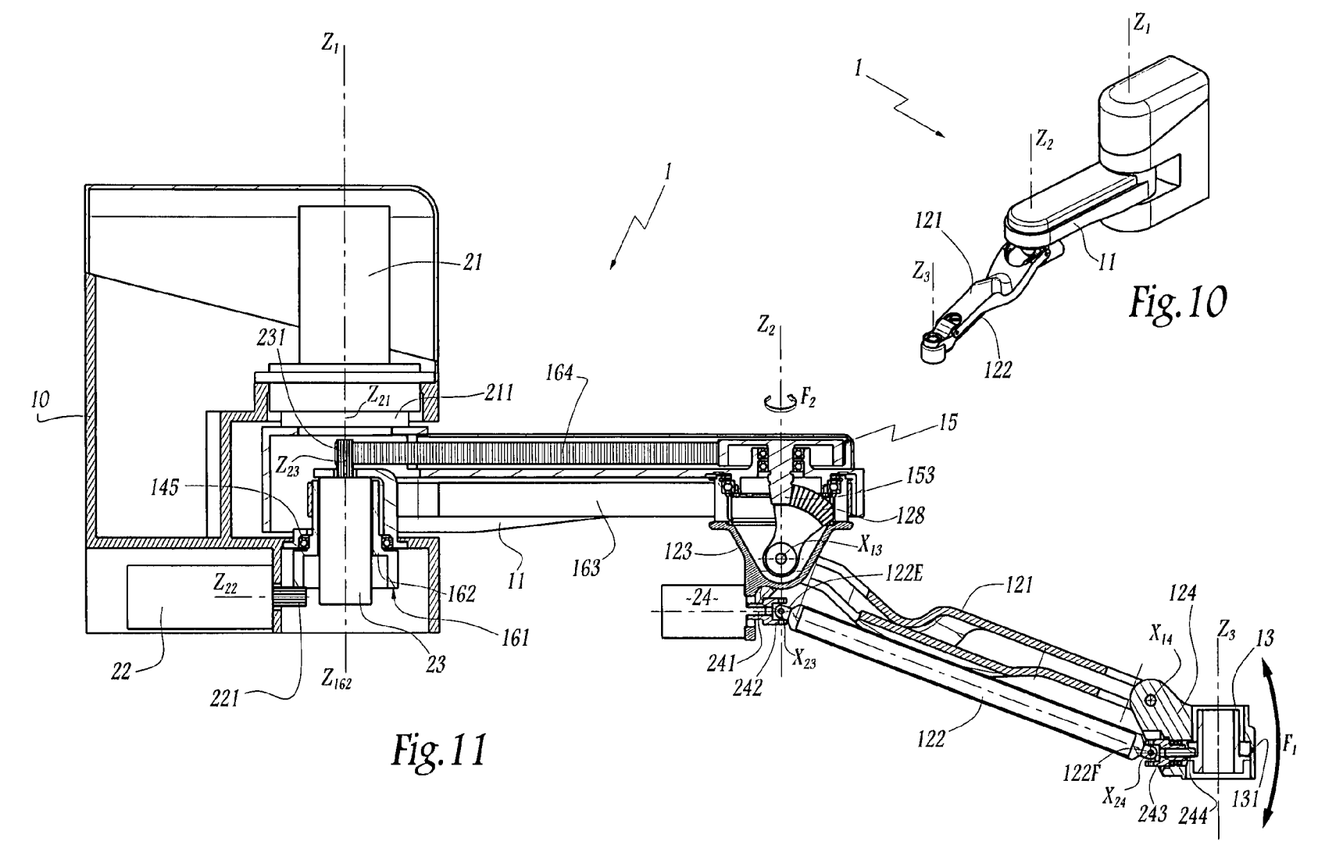
FIG. 10 is a view analogous to FIG. 1, and on a smaller scale, for a structure in accordance with a fourth embodiment of the invention.
FIG. 11 is a longitudinal section analogous to FIG. 2 for the structure of FIG. 10.

The description of the fourth embodiment relates only to its differences relative to the second embodiment.

In this embodiment, the inertia of the terminal portion of the structure 1, i.e. the portion carrying the clamp 13, is further reduced by the fact that the fourth actuator 24 is mounted on the plate 123 of the forearm 12 whereby the forearm is connected to the arm 11.

A "main" first connecting rod 121 is driven to turn relative to the plate 123 and about an axis $X_n$ in a manner comparable to that of the second embodiment by means of belts 163 and 164 respectively driven by second and third actuators, and by means of an angle transmission with bevel gears comprising a gearwheel 153 and a toothed sector 128.

The outlet shaft 241 of the actuator 24 engages a fork 242 connected via a spider (not shown) to a first end 122E of the "secondary" or "auxiliary" second connecting rod 122. The second end 122F of the secondary rod, i.e. its end remote from the first end, is connected via another spider (not shown) to a second fork 243 secured to a gearwheel 244 that engages a toothed surface 131 of the clamp 13 in order to drive the clamp in rotation about a vertical axis $Z_3$ parallel to the hinge axis $Z_2$ between the forearm 12 and the arm 11.

The spiders in the joints between the forks 242 and 243 and the connecting rod 122 enable the axes $X_{23}$ and $X_{24}$ to be defined. The axes $X_{13}$ and $X_{14}$ are defined by shafts or pegs, as in the above embodiments.

In this embodiment, the secondary connecting rod 122 performs two functions: it constitutes the second connecting rod of the deformable parallelogram constituting the forearm 12; and it transmits the rotary motion represented by the arrow $F_3$ from the fourth actuator 24 to the tool-carrier clamp 13.

The joints between the elements 122, 242, and 243 may be considered as a pair of cardan joints.

Otherwise, the third and fourth embodiments operate in the same manner as the second embodiment. In particular, three actuators 21, 22, and 23 are mounted on a base 10 to drive the arm 11 about a vertical axis $Z_1$ and the forearm 12 about a vertical axis $Z_2$ and also in vertical pivoting about axes $X_{13}$ and $X_{23}$. The forearm 12 presents a deformable parallelogram structure. A gearwheel mounted on the outlet shaft 221 of the actuator 22, a toothed portion 161 of the portion 162, and belts 163 and 164 serve to transmit rotary motion respectively from the second actuator 22 to the plate 123 about the axis $Z_2$, and from the third actuator 23 to the first connecting rod 121 via the 90° angle transmission 153/128.

In the embodiments described, the actuators 21 to 24 are formed by rotary electric gear motors. In the meaning of the invention, a gear motor is not necessarily fitted with its own gear member, in which case it presents a reduction ratio equal to 1.

In all of the embodiments, the first connecting rod 121 is "main" in the sense that the actuator 23 serves mainly to control its pivoting about the axis $X_{13}$. This pivoting induces pivoting of the second connecting rod 122, which thus constitutes a follower for this motion. The pivoting of the forearm 12 in the height direction is thus controlled directly by the actuator 23 via the pulley 15, for the first connecting rod 121 and indirectly, via the connecting rod 121 and the plates 123 and 124 for the second connecting rod 122.

In a variant of the invention that is not shown but that applies to all of the embodiments, the second actuator 22 may be mounted on the base with the axis of rotation of its outlet shaft being parallel to the axis of rotation of the pulley 162. A belt is used to transmit motion between said actuator and said pulley. Under such circumstances, the actuator 22 controls rotation of the forearm 12 about the axis $Z_2$ by means of two belts and an intermediate pulley.

The technical characteristics of the above-mentioned embodiments may be combined with one another in the ambit of the present invention.

In the ambit of the present invention, the angle transmission used for driving the main connecting rod 121 of the forearm may comprise a pair of gears that are bevel, spiral-bevel, hypoid, or of CYLKRO® facing gears. In a pair of hypoid gears, the axes of rotation of the gearwheel and of the toothed wheel do not intersect. It is also possible to use a wormscrew system, as mentioned above.

Whatever the embodiment under consideration, the structure of the invention enables the overall size of the robot, i.e. the envelope swept by its moving portions, to be small in a vertical direction while making possible horizontal and vertical movements that are of significant amplitude.

The invention claimed is:

1. An articulated structure for a multi-axis robot having at least three degrees of freedom, the structure comprising:

a base;
an arm hinged to the base about a first axis;
a forearm hinged to the arm about a second axis parallel to the first axis, the forearm forming a deformable parallelogram structure and including a first connecting rod and a second connecting rod that are hinged to two plates about respective axes that are perpendicular to the first and second axes;
a first electric actuator controlling pivoting of the arm about the first axis;
a second electric actuator controlling pivoting of the forearm about the second axis; and
a third electric actuator controlling pivoting of the first connecting rod relative to the plates about the axes that are perpendicular to the first and second axes; and
the third actuator being mounted directly on one of the base and the arm.

2. The structure according to claim 1, wherein the third actuator is a rotary actuator having an outlet shaft that is centered on an axis parallel to the first axis.

3. The structure according to claim 1, wherein at least one belt and a 90° angle transmission are connected between the third actuator and the connecting rods.

4. The structure according to claim 3, wherein the angle transmission includes a pair of gears selected from a group of gears including bevel, spiral-bevel, hypoid, or CYLKRO® gears.

5. The structure according to claim 1, wherein the third actuator is mounted on the arm.

6. The structure according to claim 1, wherein at least the first and third actuators are mounted on the base.

7. The structure according to claim 6, wherein the third actuator is of a rotary actuator having an outlet shaft with an axis of rotation in alignment with the first axis.

8. The structure according to claim 6, wherein the first and third actuators are rotary actuators having outlet shafts with axes of rotation in alignment.

9. The structure according to claim 1, wherein one of the two connecting rods of the forearm forms a box that surrounds the other connecting rod.

10. The structure according to claim 1, including a fourth actuator controlling pivoting of a tool-carrier clamp about an axis parallel to the first and second axes.

11. The structure according to claim 10, wherein the first connecting rod is connected so as to rotate about one of the axes perpendicular to the first and second axes, the second connecting rod follows the first connecting rod in the pivoting motion relative to the plates, the fourth actuator is mounted on a plate of the forearm that is hinged to the arm, the tool-carrier clamp is supported by the other plate, and wherein the second connecting rod transmits to the tool-carrier clamp motion generated by the fourth actuator.

12. A multi-axis robot including an articulated structure having at least three degrees of freedom, the structure comprising:

a base;
an arm hinged to the base about a first axis;
a forearm hinged to the arm about a second axis parallel to the first axis, the forearm forming a deformable parallelogram structure and including a first connecting rod and a second connecting rod that are hinged to two plates about respective axes that are perpendicular to the first and second axes;
a first electric actuator controlling pivoting of the arm about the first axis;

a second electric actuator controlling pivoting of the forearm about the second axis; and a third electric actuator controlling pivoting of the first connecting rod relative to the plates about one of the axes that are perpendicular to the first and second axes; and the third actuator being mounted directly on one of the base and the arm.

* * * * *